Figure 1:
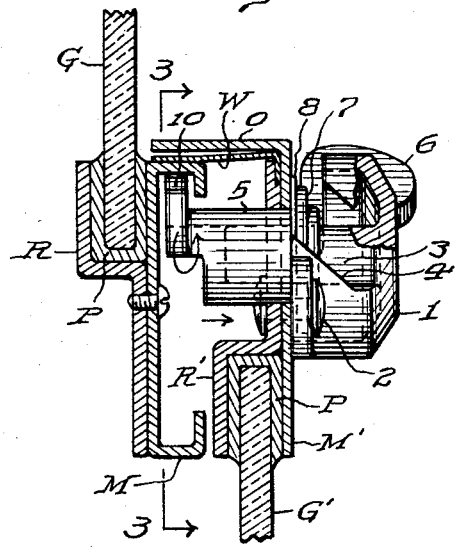

March 14, 1933.  E. P. HUTTGER  1,900,936
WINDOW FASTENER
Filed Nov. 1, 1929  4 Sheets-Sheet 1

WITNESS
F. J. Hartman

INVENTOR
Edward P. Huttger
BY
ATTORNEYS

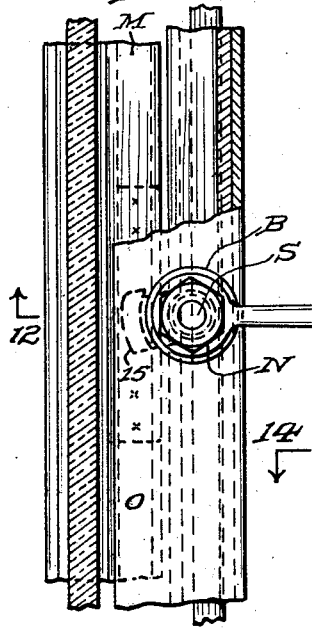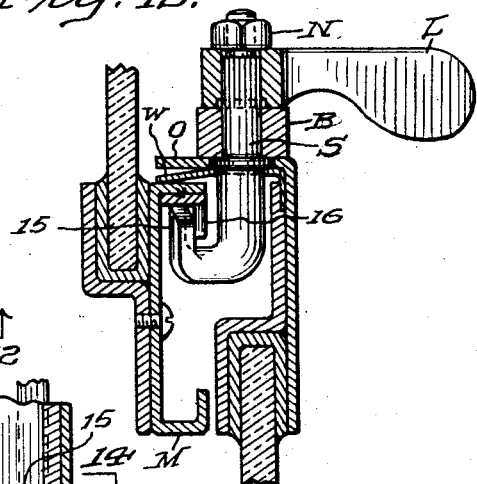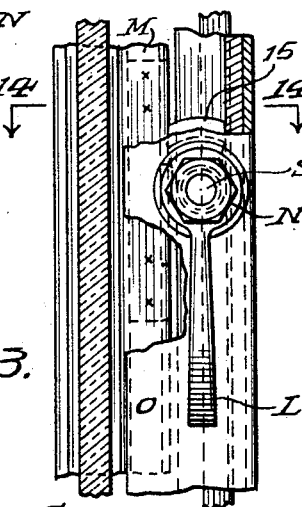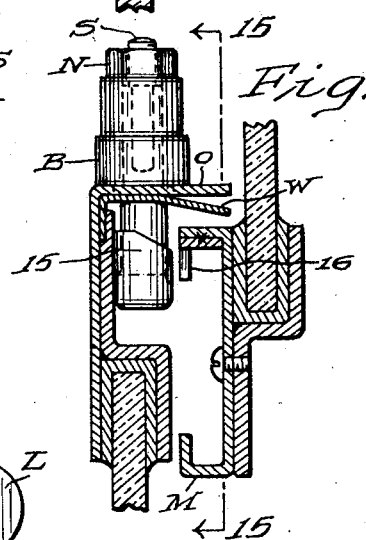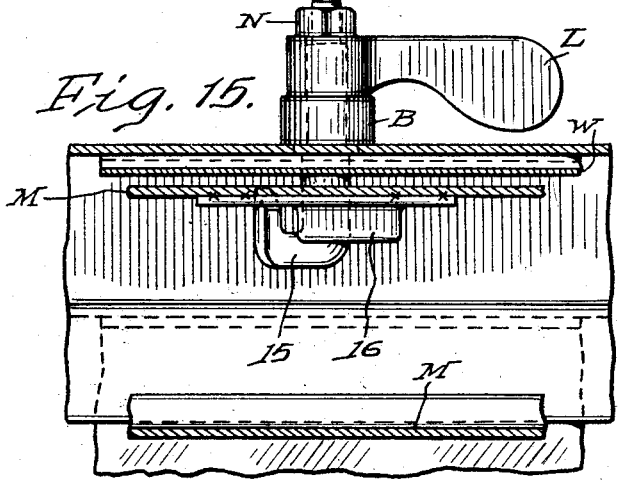

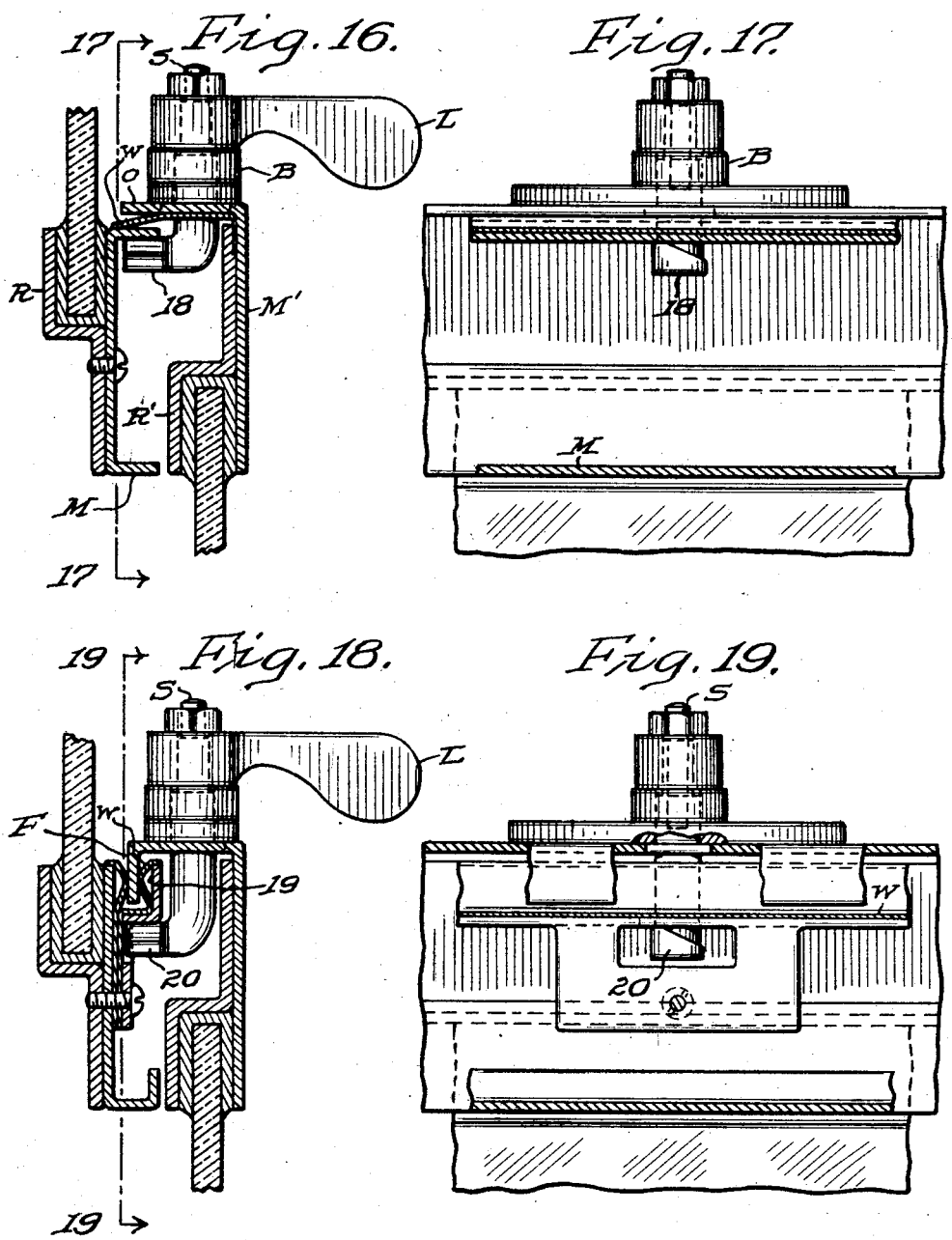

Patented Mar. 14, 1933

1,900,936

UNITED STATES PATENT OFFICE

EDWARD P. HUTTGER, OF PHILADELPHIA, PENNSYLVANIA, ASSIGNOR OF ONE-HALF TO ALEXANDER J. GIBSON, OF PHILADELPHIA, PENNSYLVANIA

WINDOW FASTENER

Application filed November 1, 1929. Serial No. 403,960.

My invention relates particularly to fasteners for metal sashes for windows and is designed especially to be employed in the type of windows having metal sashes which slide vertically in the frames, the sashes overlapping when the window is open and filling the frame with but a relatively small overlap when the window is closed.

In windows of the class referred to it has heretofore been customary to provide sashes comprising relatively wide and heavy members since the fasteners heretofore employed for such windows have required relatively broad meeting rails to permit their proper mounting and operation.

It will be understood that windows of the class described have heretofore been provided with fasteners comprising two members, one of which is mounted on the upper surface of each meeting rail, and of which one engages the other to lock the window when the windows are in closed position, and the meeting rails therefore closely adjacent. In windows of this type the wide meeting rails required have necessitated that the panes in the respective sashes be widely offset in order to permit free and unobstructed movement of the meeting rails between them in opening and closing the windows. Furthermore, it has been difficult to secure a tight fastening of the window when weather stripping is used in the frame at the top and the bottom of each sash since it has been difficult to apply the force necessary to properly seat the sashes against the weather stripping without the aid of mechanical means, window fasteners heretofore devised having been almost invariably inadequate to effect this final seating of the sashes whereby air leakage between the meeting rails and at the top and bottom of the window almost invariably results. Additionally, this difficulty of finally seating the sashes, when fasteners of the prior art are employed, has frequently resulted, through accident or carelessness, in the improper locking of the windows, thereby facilitating and encouraging entry of marauders through the windows.

In avoiding these and other disadvantages of window fasteners heretofore used I have provided a fastener which may be mounted on relatively narrow meeting rails, thus permitting the panes to be less widely offset, greatly improving the appearance of such metal sash windows and permitting them to be mounted in a smaller space, whereby the width of the frame may be materially decreased. Additionally, I have provided a fastener which may be applied to a metal sash without impairing the impermeability of weather stripping at the meeting rails and which is effective to seat the sashes securely against the weather stripping at the top and bottom of the frame. My fastener is also of such nature as to prevent the window being jimmied open from the outside inasmuch as access to the fastener between the sashes is virtually impossible and the fastener is of such nature as to resist separation of the meeting rails in any direction. I have furthermore provided a fastener of greatly improved appearance which is operative to lock the window with greater ease than any fastener heretofore devised and which is of relatively simple construction, which does not get out of order from use or abuse and which is of such durable nature as to subsist and remain fully operative throughout the life of the window to which it is applied.

In accomplishing these and other objects of my invention and with reference briefly to its application to a window comprising a pair of vertically slidable parallel sashes, I provide meeting rails of a novel and unusual form having channels suitably formed to receive the glass pane and provided with suitable fissures for disposing putty or other material about the edges of the glass to effect an air-tight seal between the glass and the rails. The outside meeting rail, that is, the lower member of the outer and upper sash in the construction above described, preferably comprises a rail whose edges form oppositely disposed rectangular channels along its inner face, that is, toward the interior of the building, the upper channel being adapted to receive a locking dog of the window fastener journaled in the inside meeting rail and provided with suitable means for manipulation to effect the locking and unlocking of the window. In a convenient form of sash for the employment of my invention, the inside meeting rail, that is, the rail at the top of the lower sash which slides inside the outer or upper sash, comprises a glazing channel surmounted by a horizontally and outwardly extending flange which overhangs to some extent the channel rail of the outside meeting rail, and between this flange and the channel rail may conveniently be disposed any suitable form of weather stripping, as a thin band of bronze or any other soft and easily pliable metal. The locking dog is operable to engage the outside meeting rail when the windows are nearly closed and to force the windows into fully closed position, and thereby force the meeting rails to compress the weather stripping, while the lower channel of the outside meeting rail provides sufficient means to protect the fastener from being tampered with from outside the window.

Figure 2:
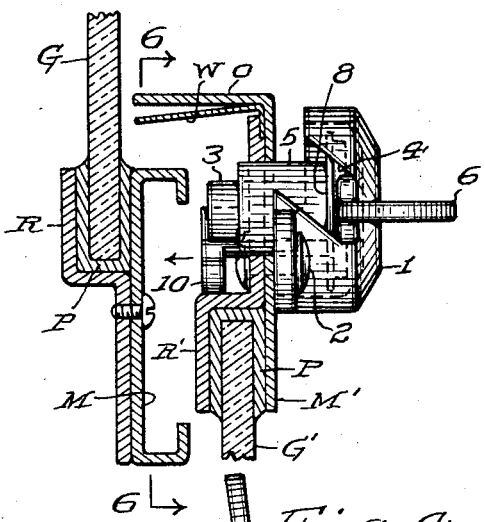
Figure 3:
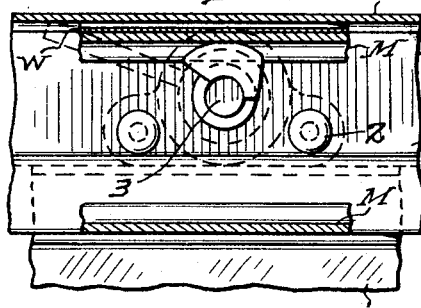
Figure 4:
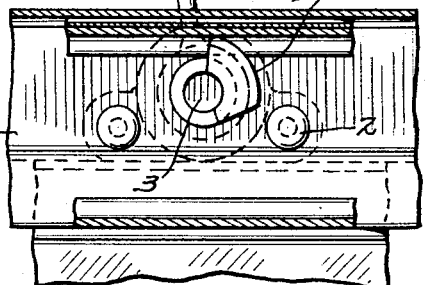
Figure 5:
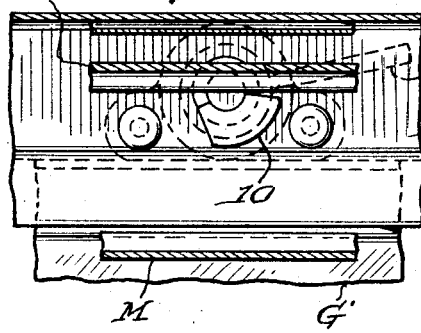
Figure 6:
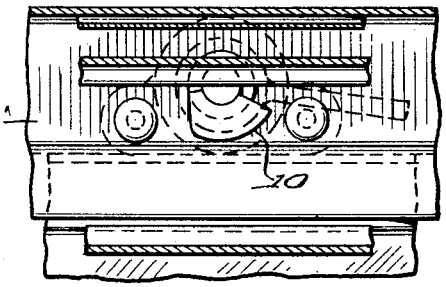
Figure 7:
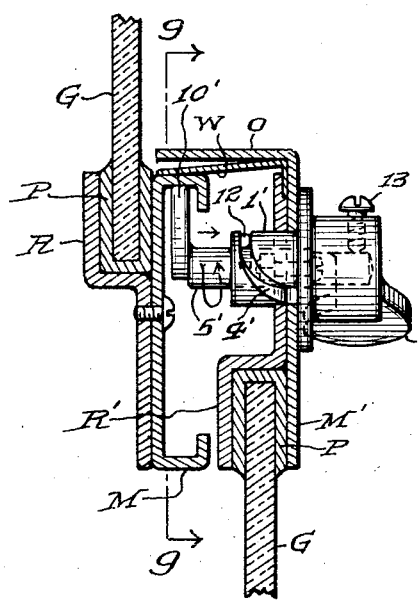
Figure 8:
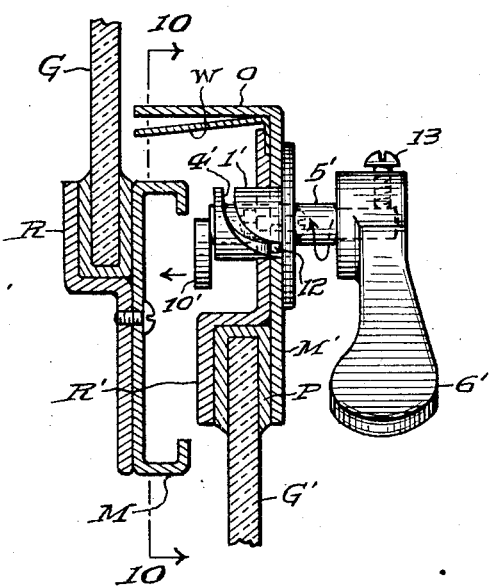
Figure 9:
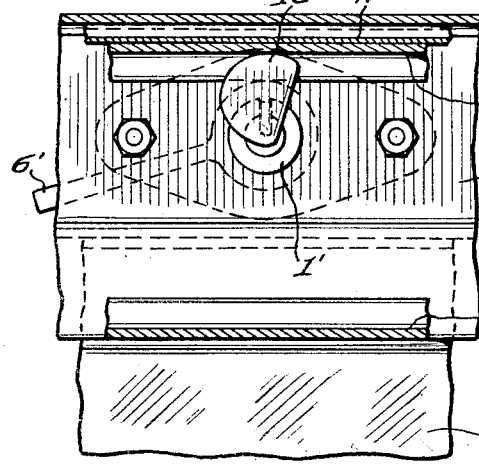
Figure 10:
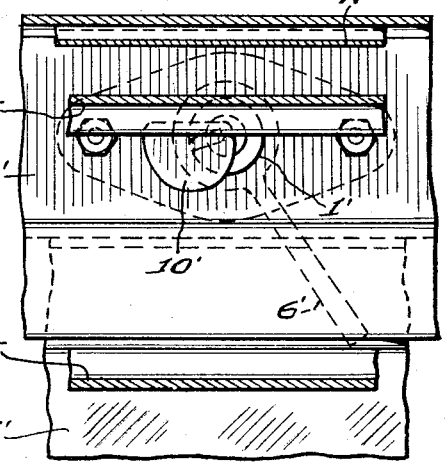

In describing now more particularly the window fastener of my invention reference will be had to the accompanying drawings of my preferred form and modified forms thereof in which Fig. 1 is a side elevation partly in section of my preferred form showing the meeting rails and portions of the panes of the window to which it is applied in section and the fastener shown in locked position. Fig. 2 is a similar view of the same structure but showing the fastener in unlocked position and the window partially opened. Fig. 3 is an end view of my fastener in locked position corresponding to the position shown in Fig. 1 and along the line 3—3 therein and in the direction of the arrows. Fig. 4 is a view similar to that of Fig. 3 but showing the fastener in closed but not locked position, and Fig. 5 shows the same fastener after disengagement of the locking dog, in unlocking, but before it has retired from the path of the meeting rail, while Fig. 6 is a view along the line 6—6 and in the direction indicated in Fig. 2 and shows the fastener in wholly unlocked position, which permits the raising or lowering of the sashes, the locking dog having retired from the path of the outside sash axially toward the inside meeting rail. Fig. 7 is a view corresponding to Fig. 1 but showing a somewhat modified form of my invention in locked position, Fig. 8 showing the same structure but with the fastener in unlocked and inoperative position; Fig. 9 is a view along the line 9—9 in Fig. 7 and Fig. 10 a corresponding view along the line 10—10 in Fig. 8. Fig. 11 is a view corresponding to Fig. 3 but of a further modified form of my invention showing a fastener mounted at the top of the meeting rail rather than at the side thereof as in the mounting of my preferred form. Fig. 12 is a side view along the line 12—12 in Fig. 11 showing the said modified form of my invention in locked position. Fig. 13 is a view corresponding to Fig. 11 but showing the same form of fastener in unlocked position and Fig. 14 is a view along the line 14—14 and in the direction of the arrows in Fig. 13. Fig. 15 is a side view of the same form of my invention showing the fastener in partially unlocked position, the said view corresponding to the line 15—15 in Fig. 14 and in the direction of the arrows. Fig. 16 is a side elevation corresponding somewhat to Fig. 12 of a still further modified form of my invention as mounted on a somewhat modified meeting rail; Fig. 17 is a view of the same form of my invention and taken on the line 17—17 in Fig. 16 and in the direction of the arrows; Fig. 18 is a similar view of a somewhat further modified form of my invention showing a channel in the outer meeting rail in which the weather stripping is disposed and into which a downwardly depending flange of the inside meeting rail enters when the window is closed, and Fig. 19 is a view on the line 19—19 in Fig. 18 and in the direction of the arrows. The same characters of reference are used to designate corresponding parts in the several figures.

In the description and drawings herein of my invention, the various forms thereof are considered as applied to a window comprising vertically slidable sashes, but it will nevertheless be understood that my invention is equally applicable to other forms of windows and to horizontally slidable sashes and in these and other forms to many analogous structures, as sliding doors or the like, as may be desired.

With reference now to Fig. 1, the upper pane G is mounted in a sash, the lower meeting rail of which comprises the angular metal glazing rail R suitably secured to the main rail M and providing between them a suitable glazing channel for the reception of the lower edge of the glass G and space wherein may be disposed putty or other suitable glazing material generally designated P in the drawings. While I have shown the rails R and M as separate rails, they may be formed entirely in one piece as by casting or otherwise if desired although I have preferred to employ separate rails for greater convenience in manufacture. The lower pane G' is suitably mounted in the lower sash, the upper meeting rail of which comprises the members R' and M' which are also preferably separately formed angular rails secured together and providing between them a suitable glazing channel for the pane G' and in which may be disposed putty P or other material according to usual glazing practice, although this invention does not contemplate any particular method of glazing and any means may be employed for securing the pane in the sash, it being, of course, preferable for practical reasons to insure an air-tight or substantially air-tight joint which has at least some slight cushioning effect to protect the glass against vibration of the building and other causes of shock and breakage. The main rail member M of the outer meeting rail is formed, as shown, having two interiorly directed portions turned inwardly toward each other providing oppositely disposed channels at its upper and lower inner edges. The inner meeting rail member M' is provided with an upper outwardly extending portion O which overhangs the upper edge of the rail member M as shown and beneath which may be disposed a strip of bronze W or other resilient material which, when suitably disposed below the upper overhanging portion O of the inner meeting rail will be engaged by the upper portion of the outer meeting rail member M and be somewhat compressed when the window is tightly closed, thereby forming a weather tight joint between the meeting rails. Mounted upon the inner face of the upper meeting rail but above the glazing channel the fastener cap 1 is secured to the member M' by any convenient means as by rivets 2 and preferably having cast integrally therewith a shaft 3 extending through the meeting rail as shown. Although I prefer for convenience in manufacture and for good appearance of the fastener to employ a bronze casting for the cap 1 and shaft 3 formed integrally therewith, it will be understood that any other material may be used if desired or that the shaft may be formed separately, if desired, and suitably secured to the cap by any convenient means. It will be observed that the cap is generally in the form of a short closed cylinder having in its cylindrical wall a slot 4, extending angularly as shown and continued circumferentially adjacent the meeting rail member M' through an arc of somewhat less than 180°. The sleeve 5 is rotatable upon the shaft 3 and is provided with an actuating lever 6 at its inner end, which projects through the slot 4 in the fastener cap 1. The flange 7 is formed on the sleeve 5 near the lever 6 and between this flange and the member M' I provide a slightly dished washer 8 of bronze or other relatively soft metal which may be compressed when the flange is forced against the meeting rail and which thus forms a relatively air-tight joint between the flange and the meeting rail when the fastener is in the position shown in Fig. 1. On the outer end of the sleeve 5, that is, the end opposite that adjacent the cap, I provide the locking dog 10 generally of the form of a cam and axially somewhat narrower than the channel formed in the upper portion of the outer meeting rail member M. It will be understood that while I prefer and have shown the sleeve 5, the lever 6, the flange 7 and the locking dog 10 as integrally cast in one piece, they may, if desired, be separately formed and suitably secured together.

In describing now the operation of the preferred form of my invention reference will first be had to Fig. 6 in which the fastener of my preferred form is shown in unlocked position, the window being very slightly opened as shown by the separation of the upper and lower meeting rail members M and O. Thus, by reference to Fig. 2 it will be seen that the actuating lever 6 projects through the cap 1 at the inner extremity of the oblique portion of the slot 4 and the locking dog 10 lies in the recess in the inside meeting rail above the lower glazing channel. Assuming now that it is desired to lock the window, the lever 6 is rotated in a clockwise direction as viewed from within the room, that is, facing from the right in Fig. 2. The oblique portion of the slot 4 permits such rotation and at the same time effects axial translation of the lever 6, thus moving the locking dog 10 into position under the upper channel of the outer meeting rail member M as shown in Fig. 5 but without engaging the latter. Continued rotation of the handle beyond the oblique portion of the slot 4 and through the circumferential portion thereof rotates the locking dog 10 until its cam portion engages the trough of the upper channel in the rail M and further rotation is effective to force the rail member M against the upper meeting rail portion O, thus moving the windows in opposite directions and securely seating the sashes against the end weather stripping and slightly compressing the weather strip W, the position of the respective parts being clearly shown in Fig. 4. The further and final rotation of the lever 6 is effective to lock the window securely, as that portion of the locking dog which now engages the outer rail is in the form of an art whose center is the center of the shaft 3, and thus it will be understood by reference to Fig. 3 that efforts to jimmy open the window are resisted radially by the shaft 3 but that no such force can operate to rotate the dog 10 into unlocked position. The downwardly depending portion of the channel rail lies inside the inner face of the dog and is therefore effective to resist efforts to separate the rails transversely of the windows, as is apparent from reference to Fig. 1.

As will be clearly understood from the foregoing, when it is desired to unlock the window the handle is rotated in the opposite direction, thus releasing engagement of the locking dog with the outer meeting rail and retracting the former into the space above the glazing channel of the inner meeting rail thus leaving the outer meeting rail free to permit the lowering of the upper sash or the raising of the lower sash the degree required, as clearly shown in Fig. 2.

The modified form of my invention shown in Figs. 7 to 10 inclusive, is mounted on the side of the inner meeting rail similarly to the mounting of my preferred form and comprises a sleeve 1' provided with a bayonet slot 4' similar in form to the slot 4 in the cap of my preferred form, the rotatable shaft 5' of the fastener being provided with a pin 12 adapted to engage the slot 4' in the sleeve and having a lever 6' or other suitable actuating means mounted thereon and secured thereto as by a set screw 13. The locking dog 10' employed in this modification of my invention is somewhat similar in form to that of my preferred form and is effective to accomplish the same result in much the same way, excepting, however, that in the form shown in the drawings a somewhat more cam-like action takes place when the window is being finally closed before locking. The advancement and retraction of the locking dog through cooperation of the pin 12 and the slot 4' during the rotation of the shaft 5' by means of the handle 6', and the results effected thereby, will be clearly apparent from the foregoing with reference to the drawings and to the description of my preferred form and it is therefore considered unnecessary to describe the operation of this form of my invention in any greater detail.

The further modified form of my invention as shown in Figs. 11 to 15, inclusive, comprises a rotatable shaft S journaled in the bushing B and having a locking dog 15 generally in the form of a hook and is mounted in the upper overhanging portion O of the inner meeting rail and thus above the lower window sash rather than on the side thereof as in my preferred form. The locking dog 15 is provided with a beveled face as shown, and the outer meeting rail may be of the form described hereinabove with a portion of the downwardly extending rib forming the side of the upper channel cut away to permit the locking dog 15 to move transversely into the channel or the rail M may be of a simple angular form in its upper portion but with a lug 16 spot-welded or otherwise secured at a point adjacent the fastener and extending downwardly a short distance as shown. Thus, as shown in Fig. 14, when the windows are nearly closed the meeting rails are closely adjacent and the locking dog 15 lies in the recess of the inner meeting rail above the glazing channel. The actuating lever L is mounted at the upper extremity of the shaft 3, extending diametrically opposite the locking dog 15. Interlocking fluting of the lever L and the shaft S prevent relative rotation of these parts and the nut N threaded on the shaft maintains their assembled relation. Thus when the locking dog 15 lies in the recess above the glazing channel, the lever L projects from the shaft parallel to the meeting rails and the locking dog may then be rotated through the lever L being moved outwardly, whereupon the beveled portion of the locking dog engages the edge of the flange of the outer meeting rail member M and is effective to force the meeting rails together, compressing the weather stripping W as the outer meeting rail rides up on the beveled portion of the locking dog. After the upper extremity of the beveled portion of the locking dog has engaged the outer rail M, further rotation of the handle moves the dog around under the flange and between the outer rail and the downwardly extending lug 16, thus firmly securing the window. Thus, forces directed to prying the window open have no component tending to force the fastener to unlocked position, while the lug which overhangs the locking dog is effective to engage the latter and resist any efforts to pry the sashes apart transversely.

As it is believed that the form and structure of this modification of my invention as hereinabove described and as shown in Figs. 11 to 15 are clearly apparent therefrom, a more detailed description thereof is herein deemed unnecessary.

While the structure and operation of the further modifications of my invention which are shown in Figs. 16 to 19, inclusive, will be apparent from reference to the above description and drawings of several forms of my invention and from the drawing of these further modified forms, a brief reference thereto will serve to disclose fully several features of these forms. In the form shown in Fig. 16 I have provided a fastener adapted for use with an outside meeting rail devoid of channels in the inner rail member M and an angularly projecting beveled dog 18 is employed as shown. While it will be understood that this fastener is probably not as fully effective for all purposes as the fasteners hereinabove described, it will nevertheless be readily comprehended that the cost of production of fasteners and meeting rails of this character is materially less than that of the forms above shown due to the much more greatly simplified construction.

In the form of my invention shown in Fig. 18 I have provided at the upper portion of the outside meeting rail member a weather stripping channel 19 which permits the weather seal at the meeting rail to be formed by the sliding contact of the downwardly depending flange F of the inner meeting rail and the weather stripping disposed in the channel, the window fastener itself being of a form similar to that shown in Figs. 16 and 17 but having a somewhat longer shaft S to permit the locking dog 20 to clear the side of the channel 19 and engage that portion of the outside meeting rail member M which forms the trough of the channel 19. It will be understood that the operative face of the locking dog 20 is in this instance also beveled, as shown in Fig. 19, and it will be readily understood that the main purpose and function of this beveled portion in the last two described forms is similar to that of the beveled portion of the locking dog 15 in the form of my invention shown in Figs. 11 to 15 inclusive, and that the operation of the last described forms is closely similar to that of the form shown in those figures. It will be observed that the form of my invention shown in Figs. 18 and 19 is such that the fastener itself is not effective to resist transverse separation of the meeting rails but that the meeting rails are so formed and constructed that the engagement between the downwardly depending flange F of the inside meeting rail and the upper channel 19 in the outside meeting rail member M is effective to prevent such separation and that, therefore, this form of my invention is not subject to the same limitations in this respect as is that shown in Figs. 16 and 17.

While it will be understood from the above description of preferred and modified forms of my invention that I have deemed the above forms most convenient for the purposes and objects thereof, it will nevertheless be further understood that I do not confine myself to the forms shown or to any particular form or method of construction or to any of the materials there disclosed as it will be fully understood that variations therein and further modifications thereof may be made without departing from the spirit and scope of my invention as defined in the hereinafter appended claims.

Having thus described my invention, I claim and desire to protect by Letters Patent of the United States:

1. In a window fastener of the class described, a cylindrical cap adapted to be supported upon a meeting rail and to support an axial shaft, a sleeve mounted on said shaft, a locking dog carried by said sleeve at one end and an actuating lever mounted on the other end and adapted to engage a slot in said cap to thereby effect axial translation of the locking dog when the sleeve is rotated upon the shaft.

2. In a window fastener of the class described, a cap adapted to be supported upon a meeting rail, a shaft fixed to the cap, a sleeve rotatably mounted on said shaft, a locking dog carried by said sleeve at one end and an actuating lever carried by said sleeve at its other end adapted to engage a slot in said cap to thereby effect axial translation of the sleeve and locking dog when said sleeve is rotated.

3. In a window fastener of the class described, a cap having a helical slot, a shaft carried by the cap, and a locking member comprising a rotatable sleeve adapted to receive said shaft, a locking dog carried by said sleeve at one end and an actuating lever carried by the sleeve at its other end and extending into said slot for cooperation with a wall thereof when the lever is moved from one position to another.

In witness whereof I have hereunto set my hand this 30th day of October, 1929.

EDWARD P. HUTTGER.